(12) United States Patent
Tafoya

(10) Patent No.: US 8,505,560 B2
(45) Date of Patent: Aug. 13, 2013

(54) APPARATUS AND METHOD OF REMOVING WATER-SOLUBLE SUPPORT MATERIAL FROM ONE OR MORE RAPID PROTOTYPE PARTS

(76) Inventor: David Jonathan Tafoya, Maple Grove, MN (US)

( * ) Notice: Subject to any disclaimer, the term of this patent is extended or adjusted under 35 U.S.C. 154(b) by 55 days.

(21) Appl. No.: 12/384,816

(22) Filed: Apr. 9, 2009

(65) Prior Publication Data

US 2009/0205682 A1 Aug. 20, 2009

Related U.S. Application Data

(62) Division of application No. 10/991,679, filed on Nov. 18, 2004, now Pat. No. 7,546,841.

(60) Provisional application No. 60/523,776, filed on Nov. 19, 2003.

(51) Int. Cl.
    *B08B 3/02* (2006.01)
(52) U.S. Cl.
    USPC ........... 134/105; 134/108; 134/113; 134/184; 134/186; 134/198; 134/200
(58) Field of Classification Search
    USPC ................ 134/105, 106, 108, 110, 113, 184, 134/186, 198, 200
    See application file for complete search history.

(56) References Cited

U.S. PATENT DOCUMENTS

| | | | |
|---|---|---|---|
| 3,777,989 A * | 12/1973 | Pacella et al. | 239/567 |
| 4,286,542 A | 9/1981 | Belcher, Jr. et al. | |
| 4,474,198 A | 10/1984 | Greenfield, Jr. et al. | |
| 4,773,436 A | 9/1988 | Cantrell et al. | |
| 5,660,194 A | 8/1997 | Sanders | |
| 5,927,309 A * | 7/1999 | Hoover et al. | 134/195 |
| 6,109,277 A * | 8/2000 | Linton et al. | 134/56 R |
| 6,115,541 A | 9/2000 | Rhodes | |
| 6,119,706 A | 9/2000 | Foederl et al. | |
| 6,279,587 B1 | 8/2001 | Yamamoto | |
| 2002/0108638 A1* | 8/2002 | Bigott | 134/18 |

* cited by examiner

*Primary Examiner* — Saeed T Chaudhry
(74) *Attorney, Agent, or Firm* — Michael A. Mochinski

(57) ABSTRACT

A support removal apparatus is disclosed for removing water-soluble support material from rapid prototype parts, substantially comprising a retention tank for holding an aqueous cleaning solution; a box manifold hydraulically coupled to the retention tank and equipped with nozzle heads in hydraulic communication with a pump's discharge; a heat chamber for housing a heating element to heat the aqueous cleaning solution to a predetermined temperature range; a drain box hydraulically coupled to the retention tank and a pump's intake to convey the aqueous cleaning solution into and through the box manifold; a thermocouple for maintaining the temperature within an optimal range; a level indicator for measuring the solution level in the retention tank for safe operability of the pump and heating element; a cabinet for housing select components of the support removal apparatus and having an integral work platform, accessible compartments, and a localized water supply; and a microprocessor having communicative capabilities for making minute adjustments to the heating element via feedback from the thermocouple and controlling operation of the pump and heating element for a pre-set time interval.

34 Claims, 13 Drawing Sheets

APPARATUS AND METHOD OF REMOVING WATER-SOLUBLE SUPPORT MATERIAL FROM ONE OR MORE RAPID PROTOTYPE PARTS

CROSS-REFERENCE TO RELATED APPLICATIONS

This application is a divisional of U.S. patent application Ser. No. 10/991,679, entitled "APPARATUS AND METHOD OF REMOVING WATER SOLUBLE SUPPORT MATERIAL FROM A RAPID PROTOTYPE PART" filed Nov. 18, 2004 now U.S. Pat No. 7,546,841, which claims the benefit of priority from U.S. Provisional Application Ser. No. 60/523,776 filed Nov. 19, 2003, entitled "APPARATUS AND METHOD OF REMOVING WATER SOLUBLE SUPPORT MATERIAL FROM A RAPID PROTOTYPE PART," the disclosures of which, including all attached documents, are incorporated herein by reference in their entirety for all purposes.

FIELD OF THE INVENTION

The present invention relates in general to an improved apparatus and method of removing water-soluble support material from one or more rapid prototype parts. More particularly, the present invention relates to an improved apparatus comprising means for heating and agitating an aqueous cleaning solution for accelerated, efficient dissolving of temporary support material generally utilized in the production of rapid prototype parts.

BACKGROUND OF THE INVENTION

Fused Deposition Modeling (FDM) is one method among a few capable of developing rapid prototype parts or functional models from a thermoplastic material such as ABS (acrylonitrile butadiene styrene) and polycarbonate. FDM utilizes a computer numeric controlled (CNC) extruder-head which squeezes a fine filament of melted thermoplastic through a modeler nozzle. The controller, operating in accord with pre-select, known variables, activates the modeler nozzle to deposit heated plastic layer-by-layer to form the desired geometric shape. In some instances where select features of the part are left unsupported as a result of the part's orientation, the FDM-based machine may incorporate the use of a second nozzle for extruding therethrough support material to create support structures for any cantilevered portions of the part. In cases where the part's build comprises small, intricate features, a water-soluble support material may be used to further facilitate or ease removal from the part's build upon completion. Once the appropriate supporting layer is built, thermoplastic, as discussed above, is extruded through the modeler nozzle to form the part's build. Once the part has finished its successive layers and the build is complete, the part is removed from the FDM-based machine for inspection and final surface preparation, which may include removal of any support material, additional machining, and/or application of a finish coating material.

In instances where a water-soluble support material is used, the art offers a range of techniques for removing the support material from the rapid prototype part. One such technique may simply involve immersing the part in a suitable solvent repeatedly via manual or automated means and manually removing the support material using a brush or a pointed tool. Another technique commonly employed in the art may involve placement within a conventional immersion parts washer of the type generally designed to remove grease, carbon, resins, tar, and other unwanted petroleum-based residuals from automotive parts and machine shop equipment. Typically, the conventional immersion parts washer of this type may comprise operable features of ultrasonics to facilitate the cleansing action of the solvent. Although the operable feature noted above may or may not adequately address the removal of support material, the conventional immersion parts washer can be costly in terms of purchase, maintenance and operation, particularly for this limited purpose, and inappropriate in a variety of environmental settings. Given that most machinery having rapid prototype part making capabilities is operated from within an office setting or a similarly suited environment, the coinciding use of a conventional immersion parts washer makes it unacceptable and inappropriate in maintaining a sound, clean environment. Further, some conventional immersion parts washer may expose one to unacceptable health risks, particularly those having ultrasonic capabilities (see *World Health Organization Report on Ultrasound and Ultrasonic Noise*, Geneva 1982).

Accordingly, there remains a need for a dedicated apparatus capable of removing water-soluble support material from one or more rapid prototype parts and operating side-by-side with a rapid prototype part making machine commonly placed and operated in an office setting or a similarly suited environment.

BRIEF SUMMARY OF THE INVENTION

In order to overcome the numerous drawbacks apparent in the prior art, an improved support material removal apparatus has been devised for use with a rapid prototype part-making machine, notably of the type having Fused Deposition Modeling (FDM) capabilities.

It is thus an object of the present invention to provide a low cost, non-complicated support material removal apparatus which may be reliably used in lieu of a conventional immersion parts washer dedicated and known in the art to remove grease, carbon, resins, tar, and other unwanted residuals from automotive parts and machine shop equipment.

It is another object of the present invention to provide such a support material removal apparatus which incorporates means for heating and agitating an aqueous cleaning solution for accelerated, efficient dissolving of support material generally utilized in the production of rapid prototype parts.

It is another object of the present invention to provide such a support material removal apparatus which possesses a minimal number of operating components to ensure sustained, reliable operation throughout its duration of use.

It is yet another object of the present invention to provide such a support material removal apparatus which is portable and operable independent of a rapid prototype part making machine.

It is yet another object of the present invention to provide such a support material removal apparatus which comprises process controller means for setting applicable set points for unattended operation.

It is yet another object of the present invention to provide such a support material removal apparatus which accommodates a variety of part shapes and sizes to afford versatility and flexibility to the operator in removing support material from rapid prototype parts and the like having unique geometric profiles.

It is yet another object of the present invention to provide such a support material removal apparatus which can be accommodated within the spatial requirements or foot print of most equipment generally observed and used in an office setting.

It is yet another object of the present invention to provide such a support material removal apparatus which is readily accessible for purposes of setup and adjustment and maintenance and repair without sustaining substantial operating downtimes.

It is yet another object of the present invention to provide such a support material removal apparatus which accomplishes the foregoing and other objects and advantages and which is economical, durable, and fully effective in performing its intended functions.

In accordance with the present invention, a support material removal apparatus has been devised for removing water-soluble support material from one or more rapid prototype parts, the apparatus comprising in combination a retention tank having attached thereto a box manifold comprising an internal pressure box formed by an outer casing and a backing plate supplementally serving as means for mounting thereto a plurality of removable nozzle heads each being in hydraulic communication with the discharge side of a pump to promote agitation of an aqueous cleaning solution comprised of sodium or potassium hydroxide, sodium or potassium carbonate, and water within the retention tank; a heat chamber for housing a heating element to heat the aqueous cleaning solution to a predetermined temperature range; a drain box in hydraulic communication with the intake side of the pump to permit circulation and removal of the aqueous cleaning solution through and from the retention tank, respectively; a thermocouple for maintaining the temperature within an optimum range for efficient and effective removal of water-soluble support material; a level indicator to ensure adequate solution level in the retention tank for safe, continued operability of the pump and heating element; a cabinet for housing the retention tank and other operable components to further the aesthetic appeal and extend the use of the support material removal apparatus; and a microprocessor having capabilities for making minute adjustments to the heating element via feedback from the thermocouple and controlling operation of the pump and heating element for a pre-set time interval.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which.

DETAILED DESCRIPTION OF THE PREFERRED EMBODIMENT

While this invention is susceptible of being embodied in many different forms, the preferred embodiment of the invention is illustrated in the accompanying drawings and described in detail hereinafter with the understanding that the present disclosure is to be considered to exemplify the principles of the present invention and is not intended to limit the invention to the embodiments illustrated and presented herein. The present invention has particular utility as an apparatus for removing water-soluble supports from one or more rapid prototype parts produced from a rapid prototype part-making machine such as those that incorporate Fused Deposition Modeling (FDM) technology.

Figure 1:
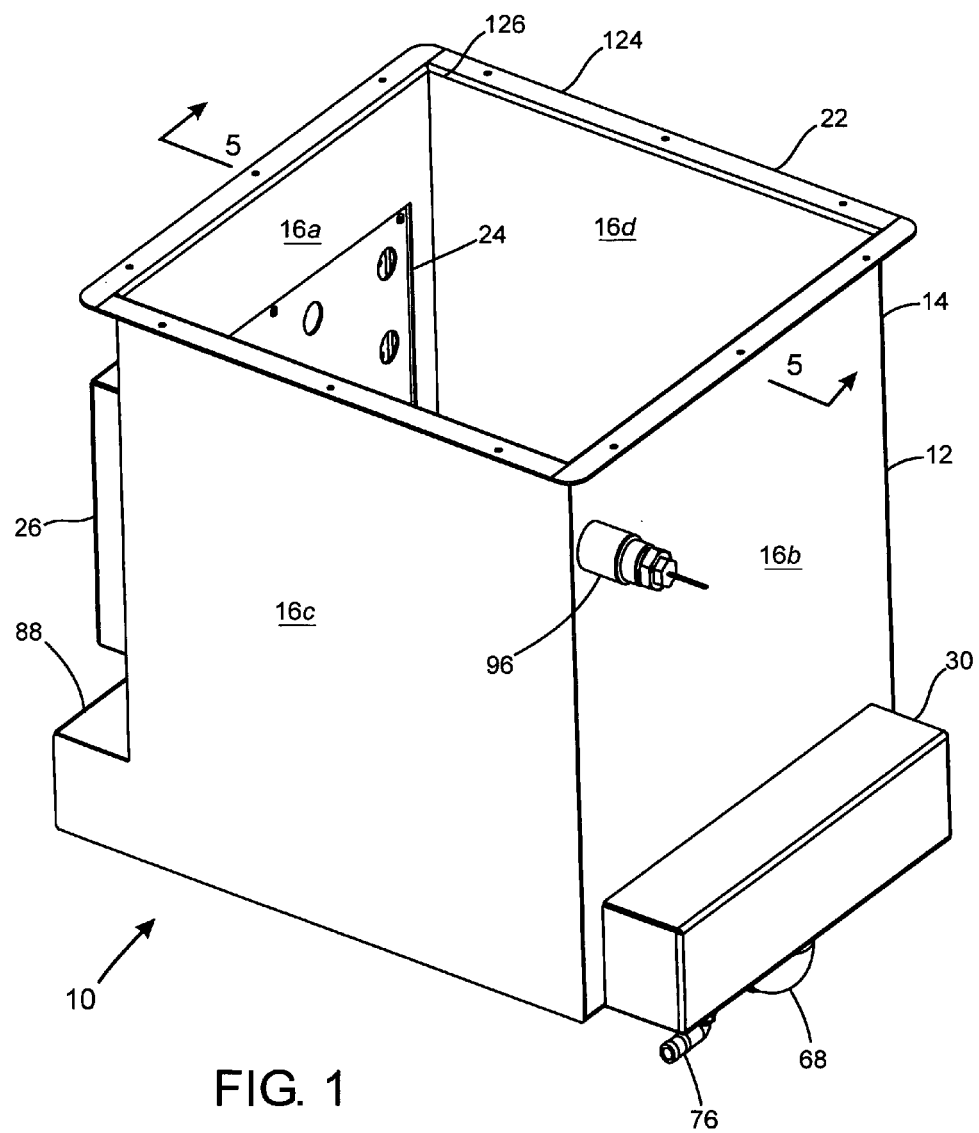
FIG. 1 is a perspective view of a preferred embodiment of the present invention illustrating a retention tank equipped with a box manifold and a drain box.

Referring now to FIG. 1, there is shown generally at 10 a support removal apparatus comprising a tank assembly 12 having means for heating and conveying an aqueous cleaning solution and means for time control of heat and conveyance outputs. The aqueous cleaning solution most suited for this application comprises a mixture of 25-70 weight percent sodium or potassium hydroxide and 5-30 weight percent sodium or potassium carbonate, collectively forming a granular sodium or potassium composition suitable for mixing with water. Preferably, the aqueous cleaning solution comprises a concentration ratio of 1.05 pounds of granular sodium or potassium composition per one gallon of water suitably serves in removing water-soluble support material from rapid prototype parts within a tolerable temperature range noted hereinafter.

The tank assembly 12, as shown in FIGS. 1-5, comprises a retention tank 14 having first, second, third, and fourth sidewalls 16a, 16b, 16c, 16d substantially arranged and connected to one another to form a box-like structure having a bottom leading edge 18 fixedly attached to and along the perimeter of a base 20, collectively forming an interior chamber 22 for containing and holding the aqueous cleaning solution. In the preferred embodiment, the retention tank of the type shown in FIG. 3 comprises an inlet opening 24 extending through the first sidewall 16*a* to accommodate and mount thereabout a box manifold 26 operatively associated with a plurality of removable nozzle heads 28 for enhanced agitation of the aqueous cleaning solution contained within the interior chamber and a drain box 30 integrally made part thereof for enhanced circulation and removal of the aqueous cleaning solution through and from the retention tank, respectively. Each nozzle head 28, as best illustrated in FIG. 6, comprises a nozzle tip 28*a* and a threaded body portion 28*b* to allow and facilitate change out and repair of the nozzle head as part of a maintenance routine. In order to develop and continually establish a predominate level of agitation within the interior chamber, each nozzle tip is suitably configured with an orifice 28*c* having a diameter ranging from 0.05 to 0.375". In this diametric range combined with a hydraulic capacity ranging from 3-30 gallons per minute at a power output ranging ⅕-2HP, each nozzle tip 28*a* is substantially capable of developing an output pressure ranging from 5 to 60 p.s.i., respectively. In this pressure range, each nozzle tip provides for a jet stream having a tight dispersion pattern capable of reaching and interacting with and reflecting off the opposing, second sidewall of the retention tank 14 to uniformly agitate the aqueous cleaning solution within the interior chamber 22.

Figure 6:
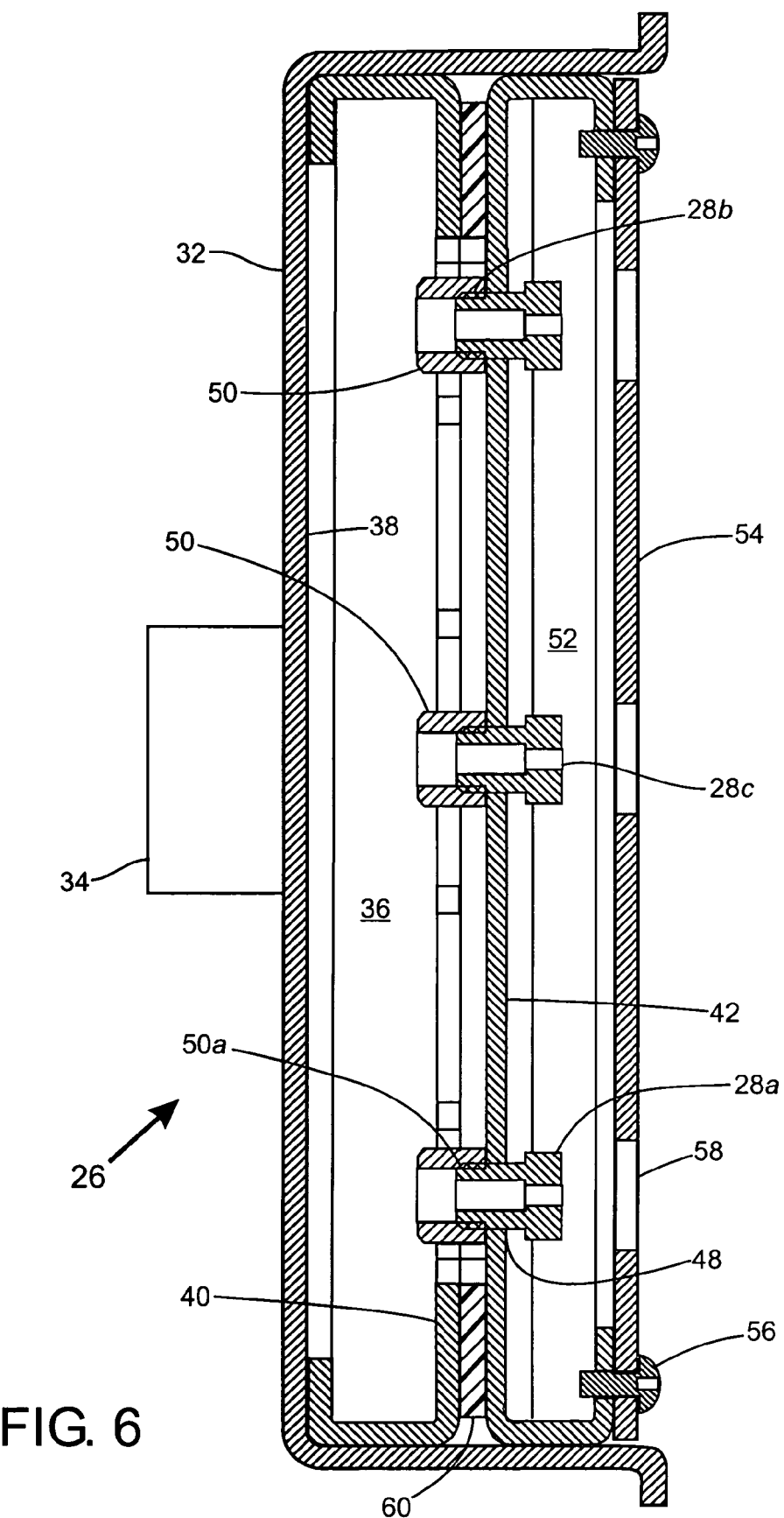
FIG. 6 is a side cross sectional view of the preferred embodiment of the present invention taken on line 6-6 of FIG. 9 illustrating a box manifold.
Figure 7:
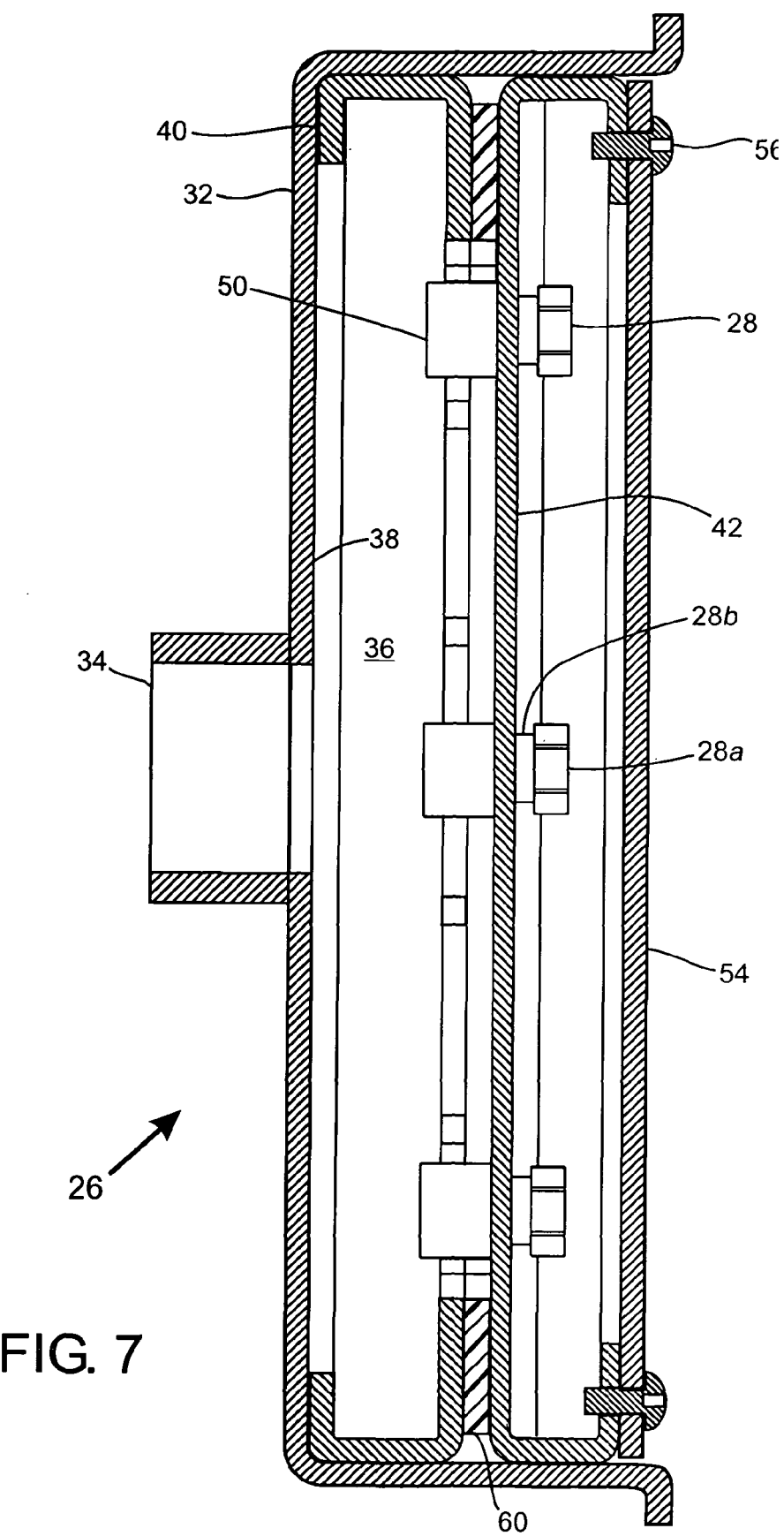
FIG. 7 is a side cross sectional view of the preferred embodiment of the present invention taken on line 7-7 of FIG. 9 illustrating a box manifold.

The box manifold 26 is shown in FIGS. 6 and 7 to comprise an outer casing 32 having an inlet adapter 34 mounted externally thereto and an internal pressure box 36 collectively formed by an inner backside 38 of the outer casing as reinforced by an interior reinforcing plate 40 integrally made part of the outer casing and a backing plate 42 supplementally suited to support and mount the nozzle heads 28. As denoted by path E in FIG. 8, the inlet adapter 34 is hydraulically connected to an outlet stem 44 of a three-way ball valve 46. As illustrated further in FIGS. 6 and 7, the backing plate comprises a plurality of apertures 48 extending therethrough to receive an equal number of collars 50 each having internal threads 50*a*. In assembled form, each collar is fixedly attached to the backing plate 42 by a bead of weld placed about its outer circumference, with a threaded body 28*b* of each nozzle head 28 being threadably connected to the collar. In furthering the protection of the nozzle head from suspended matter, each nozzle tip 28*a* as depicted in FIGS. 6 and 9 is positioned within a cavity 52 substantially formed by the backing plate and a nozzle plate 54 attached thereto by a plurality of screws 56 and the like. In order to sustain passing of the aqueous cleaning solution into the interior chamber, yet mitigating the passage of small rapid prototype parts and residual support material into the box manifold 26, the nozzle plate further comprises a plurality of small apertures 58 each being positionally aligned with each of the nozzle heads, substantially in the manner depicted in FIGS. 6 and 9. A gasket 60 situated in between the reinforcing and backing plates mitigates leakage of the pressure box 36 to the extent of maintaining a sustained amount of pressure within the internal pressure box so as to facilitate passing of the aqueous cleaning solution through the nozzle head 28 and forcibly into the interior chamber 22.

Figure 2:
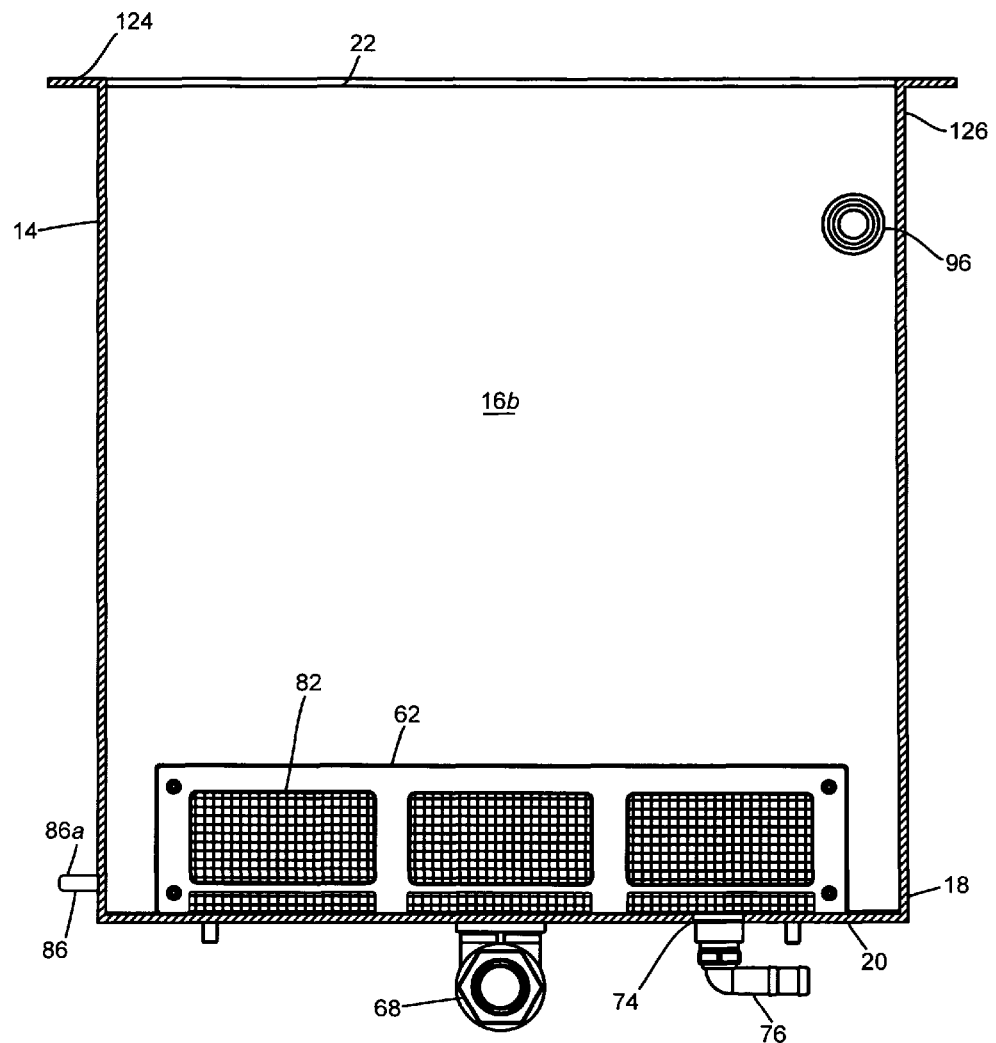
FIG. 2 is a side cross-sectional view of the preferred embodiment of the present invention taken on line 2-2 of FIG. 4 illustrating a drain box fitted with a drain intake.
Figure 3:
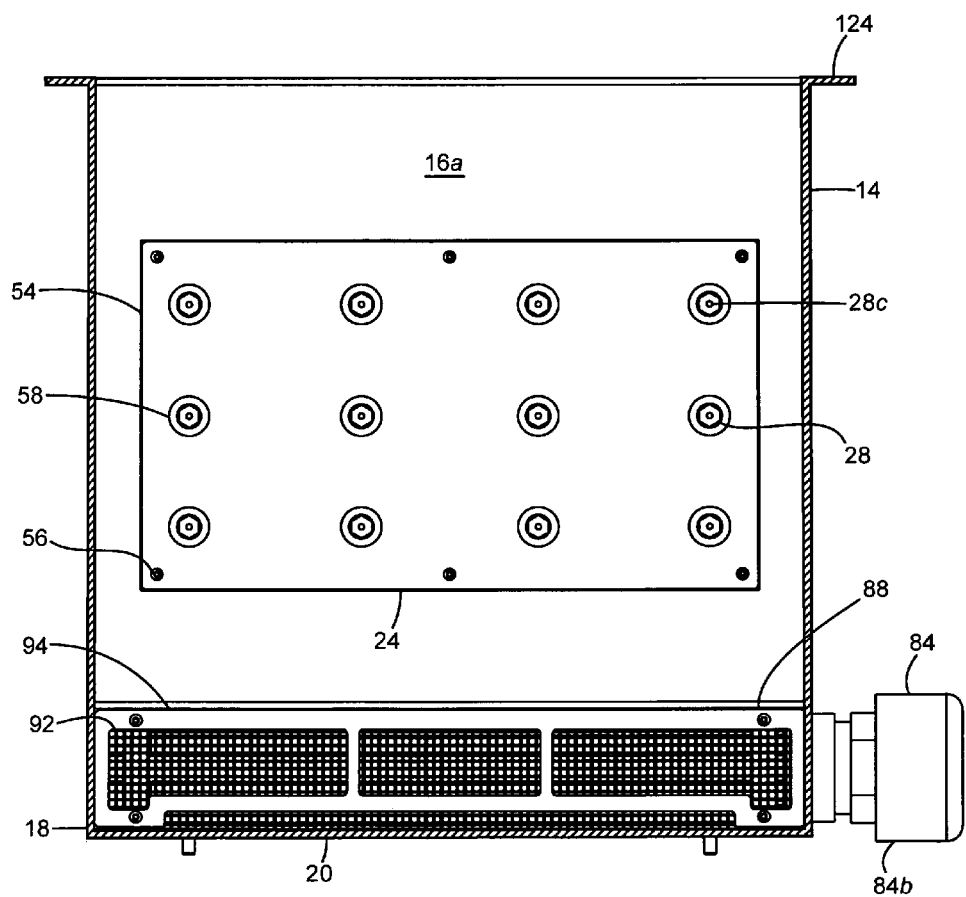
FIG. 3 is a side cross-sectional view of the preferred embodiment of the present invention taken on line 3-3 of FIG. 4 illustrating a box manifold and a heating element mounted therebelow and housed within a heat chamber.

Referring now to FIGS. 1 and 2, the drain box 30 is generally shown to extend the full width of one of the sidewalls of the retention tank 14 and comprises a drain intake 62 and a bottom 64 preferentially coinciding with the position of the base. An outlet opening 66 extending through the bottom of the drain box receives an outlet line 68 extending therefrom and terminating at an intake side 70 of a pump 72, as denoted by path C in FIG. 8. Pumps most suited for this application comprise of types having centrifugal or magnetic operable means, to name a couple known in the art to possess favorable characteristics to hydraulically convey and circulate aqueous cleaning solution in and through the retention tank 14. However, regardless of the pump type used, pump seals as well as other operable components thereof are preferably fabricated from materials that are compatible for use in a corrosive, caustic environment given the alkalinity of the aqueous cleaning solution. Accordingly, seals made from ethylene propylene diene monomer (EPDM) or Viton™ and metallic components made from stainless steel tolerably perform well within the predetermined range of operation (temperature and pH) without deleterious impact to pump performance. A water input opening 74 extending through the bottom 64 suitably receives a fitting 76 for connecting pipe therefrom to a water feed ball valve 78 primarily serving as means for feeding fresh water from an external water source 80 into the drain box 30 and subsequently into the retention tank 14, as denoted by paths A and B in FIG. 8. As further shown in FIG. 2, the drain intake 62 is selectively fitted with a screen 82 to inhibit the passage of small rapid prototype parts and residual support material into and through the drain box 30, pump 28 and water feed ball valve 78, yet affording continuous passage of the aqueous cleaning solution.

In furthering the cleansing action of the aqueous cleaning solution for sustained and effective removal of support material from one or more rapid prototype parts, the retention tank 14 is configured with a heating element 84 cooperating with a thermocouple 86 for continuous control thereof. The heating element of the type illustrated in FIG. 5 comprises an internal end 84*a*, preferably of the band type, situated near the base and housed within a heat chamber 88, preferentially extending about the width of the sidewall 16 and placed opposite to the location of the drain box 30, below the box manifold, and an external end 84*b* communicatively coupled to a microprocessor 90. Similar to the drain intake 62 in terms of function and operation, a screen 92 is placed over and mounted to an elongate opening 94 of the heat chamber. Although numerous types of heating elements may be suited for this application, it is preferred that the heating element 84 comprise a power rating ranging from 50-300 Watts/sq. in., a power rating of which substantially heats the aqueous cleaning solution to 90-180° F. within a modest time range of at least 15-90 minutes, respectively. The heating element may comprise a variety of geometric configurations and design features other than the preferred band type such as those having an internal end selectively shaped as a cable, tubular cartridge, strip, to name a few most widely known and available in the art, providing each meets the above operating specifications. It is noted herein that the present invention may alternatively comprise a heating element 84 mounted externally to the retention tank in lieu of the heating element mounted internally within the heat chamber 88. In such instance, the retention tank primarily serves as a suitable conductor in transmitting heat to the aqueous cleaning solution. In addressing the requirements of a retention tank having a larger volumetric capacity, a heating element with a proportionally higher heatable surface area may be needed or required to maintain the overall effectiveness of the aqueous cleaning solution. Given the operating characteristics of the aqueous cleaning solution in terms alkalinity, the internal end 84*a* preferably comprises a sheath 84*c* fabricated from materials such as stainless steel 304 or 316, Inconel, Incoloy, Monel, or titanium, collectively of the type capable of resisting premature failure of the heating element 84 during operative conditions.

Figure 4:
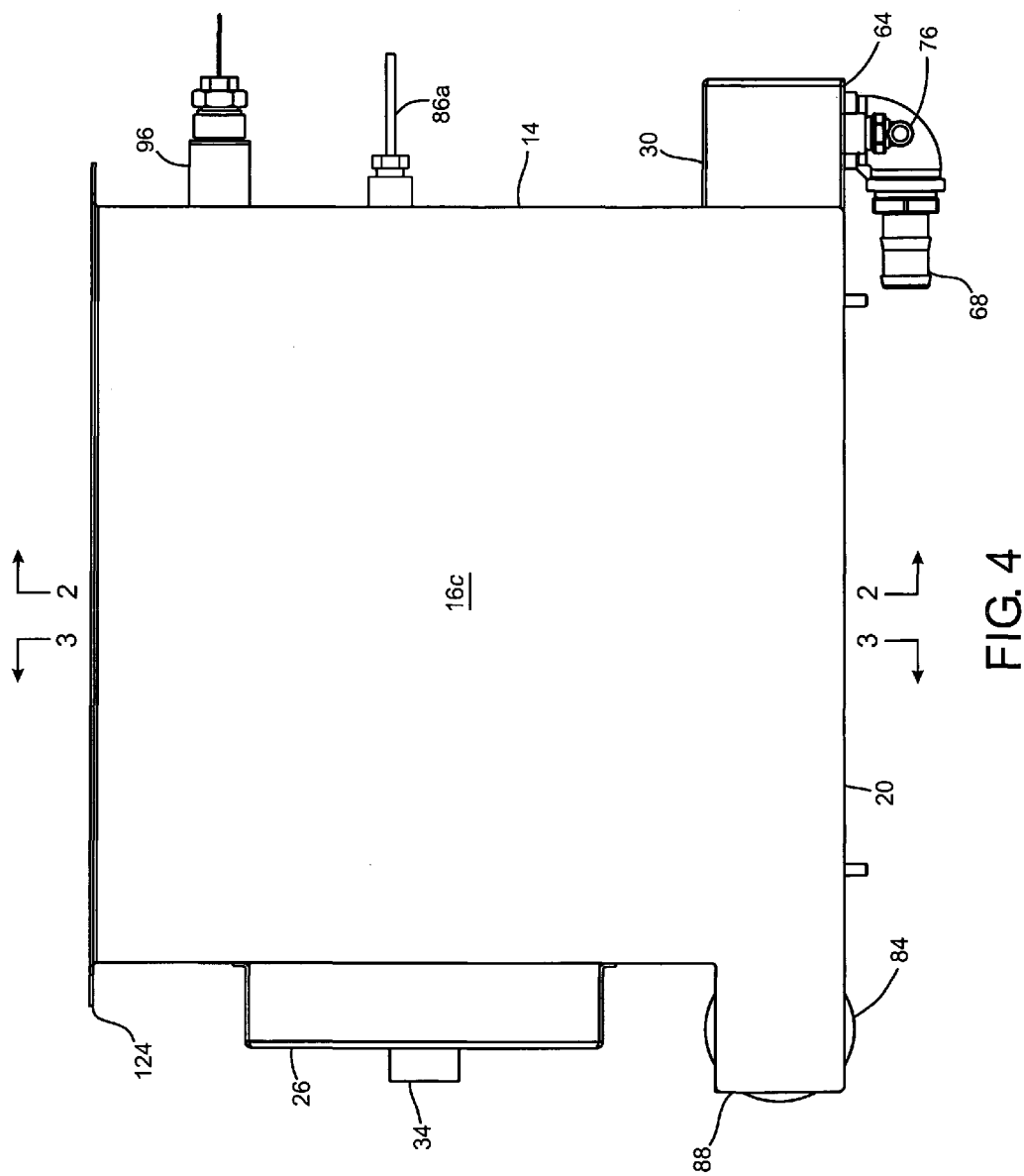
FIG. 4 is a side elevational view of the preferred embodiment of the present invention illustrating a drain box and a box manifold mounted to a retention tank.
Figure 5:
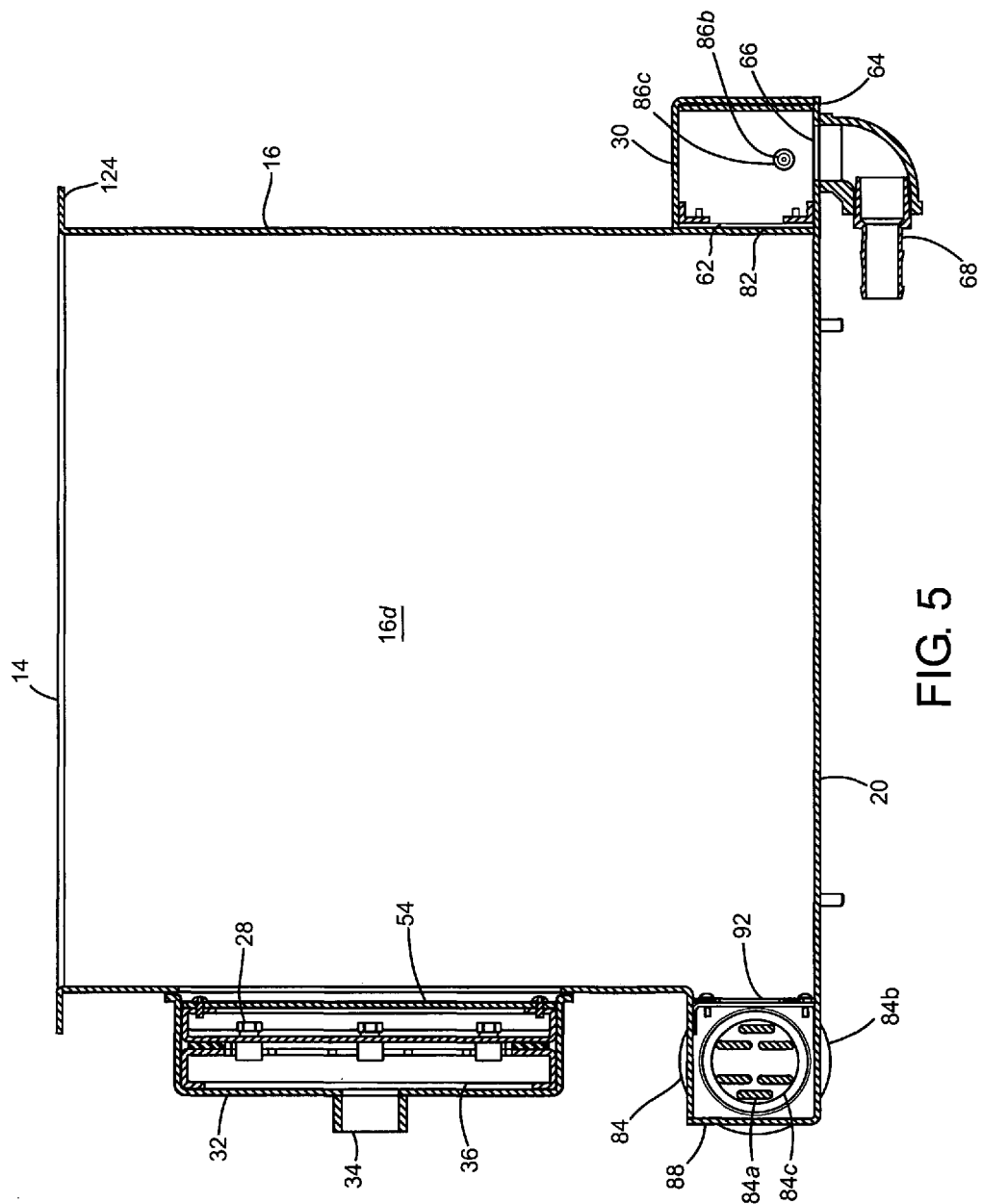
FIG. 5 is a side cross-sectional view of the preferred embodiment of the present invention taken on line 5-5 of FIG. 1 illustrating a box manifold and a heating element mounted therebelow and a drain box positioned across therefrom.

The thermocouple 86 of the type shown in FIGS. 4 and 5 is operatively associated with the heating element 84 to functionally serve as means for controlling the temperature of the aqueous cleaning solution within an optimal range of approximately 40° F. to the set point of 150° F. The thermocouple, preferably of the type depicted in FIGS. 4 and 5 and offered in the art among others, comprises an external lead 86a communicatively coupled to the input side of the microprocessor 90 and an internal probe 86b positioned within the drain box 30 or alternatively within the retention tank 14, either position of which being readily capable of sensing the ambient temperature of the aqueous cleaning solution and making timely and minute adjustments to the heating element 84 via the microprocessor 90. Like the heating element in terms of material choice, the internal probe 86b preferably comprises a sheath 86c fabricated from or coated with a material most compatible for operation in a corrosive environment.

Figure 10:
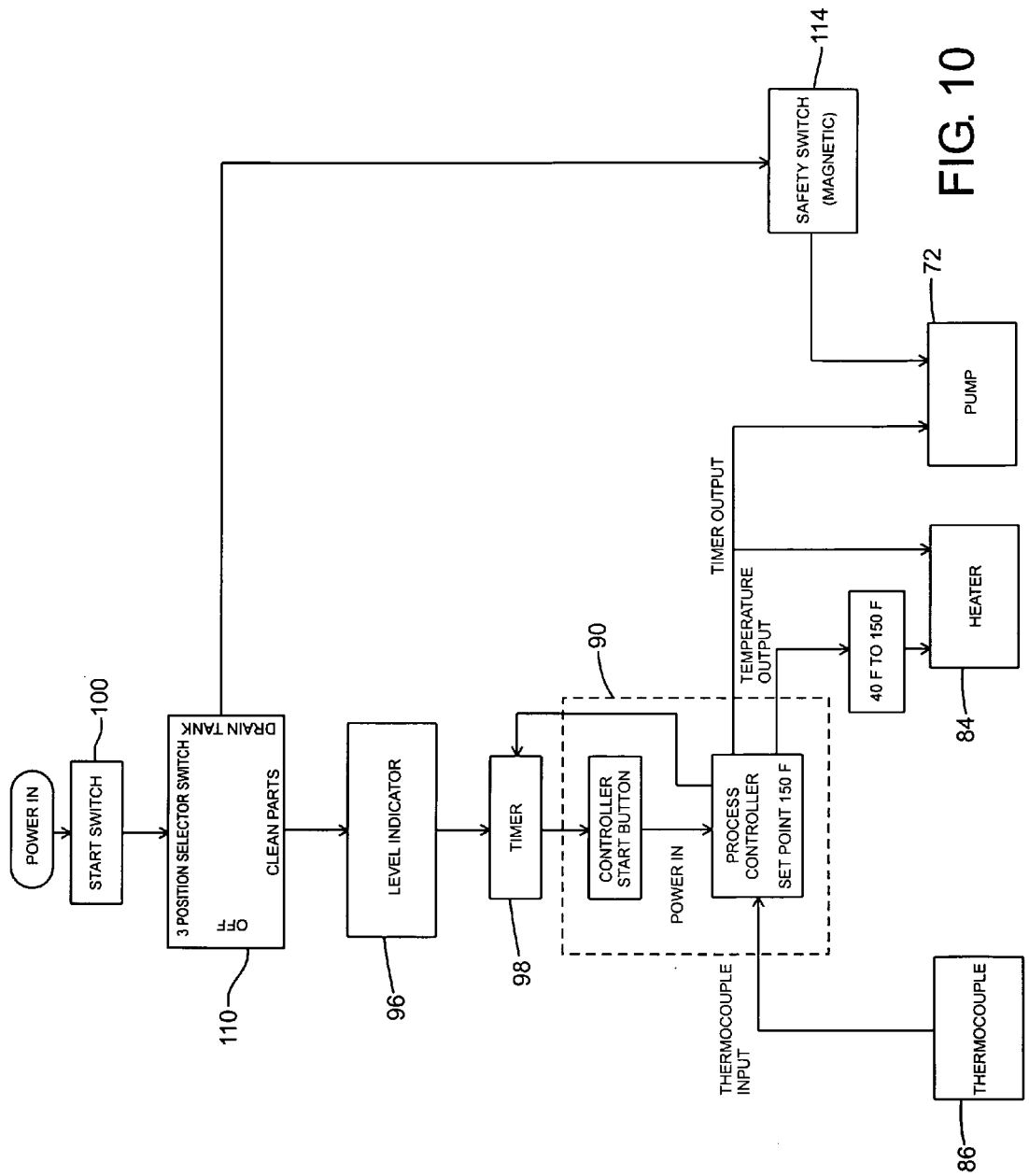
FIG. 10 is a flow diagram of the preferred embodiment of the present invention illustrating a microprocessor communicatively coupled to a thermocouple, pump, heating element, level indicator, and a three-position selector switch.

In addition to the available means for heating and conveying the aqueous cleaning solution, a level indicator 96 of the type shown in FIGS. 1 and 4 provides means for activating power to the microprocessor 90 to correspondingly allow activation of a timer switch 98 for controlling the duration of operating the heating element and pump 72. Further, the level indicator suitably serves as a safety device insofar of eliminating premature activation of the pump when the interior chamber 22 is absent or is low of aqueous cleaning solution. In other words, the level indicator primarily serves to monitor the level of the aqueous cleaning solution within the interior chamber 22 to ensure inoperative status of the pump 72 in the event that the solution level is inadequate to support flow through the pump and box manifold 26 and further ensure that each nozzle head 28 is situated below the solution's level. Level indicators 96 comprising operable features of optics, magnetic, mechanical means, to name a few commonly available in the art, may be suited for this application providing each comprises means for connectivity to the microprocessor 90. As illustrated in FIG. 10, the microprocessor 90 selectively controls outputs to the pump 72 and heating element 84 operably based on time and temperature set points established by the operator or manufacturer. In the preferred embodiment, a temperature set point of approximately 150° F., as set by the manufacturer, establishes optimal performance of the aqueous cleaning solution. Time input, on the other hand, is selectively controlled by the user via an interface controller (not shown) comprising means for displaying operating variables of temperature and time. An example of a suitable microprocessor 90 for this application is the type manufactured by the Watlow Company of St. Louis, Mo., specifically being designated as Watlow Series 935B. It should be understood that many other types of microprocessors might be used in this application providing it comprises capabilities to control the desired outputs noted and stated herein. It is further understood that all electrical components described above, including the pump, heating element, thermocouple, level indicator and microprocessor, may be electrically wired in any known manner.

In summarizing operation of the level indicator 96, with reference being made to FIG. 10, power is initially supplied thereto by means of activating a start switch 100. Upon the level indicator detecting a suitable level of aqueous cleaning solution in the retention tank 14, power is further transmitted to the microprocessor at which time the operator is prompted to set the timer or temporal limits for operating the pump 72 and heating element 84. Process startup is finally achieved by the operator activating a controller start button (not shown) integrally made part of the microprocessor. It is noted herein that the heating element only operates within a temperature range of approximately 40° F. to the set point of 150° F. notwithstanding the time inputs, in contrast to the pump 72 which operates for the full duration of the time input. Upon expiration of the timer's set limits, power to the pump 72 as well as the heating element 84 is disabled via the microprocessor 90. Reactivation of the cleaning cycle substantially involves re-setting the timer function and activating the controller start button.

Figure 8:
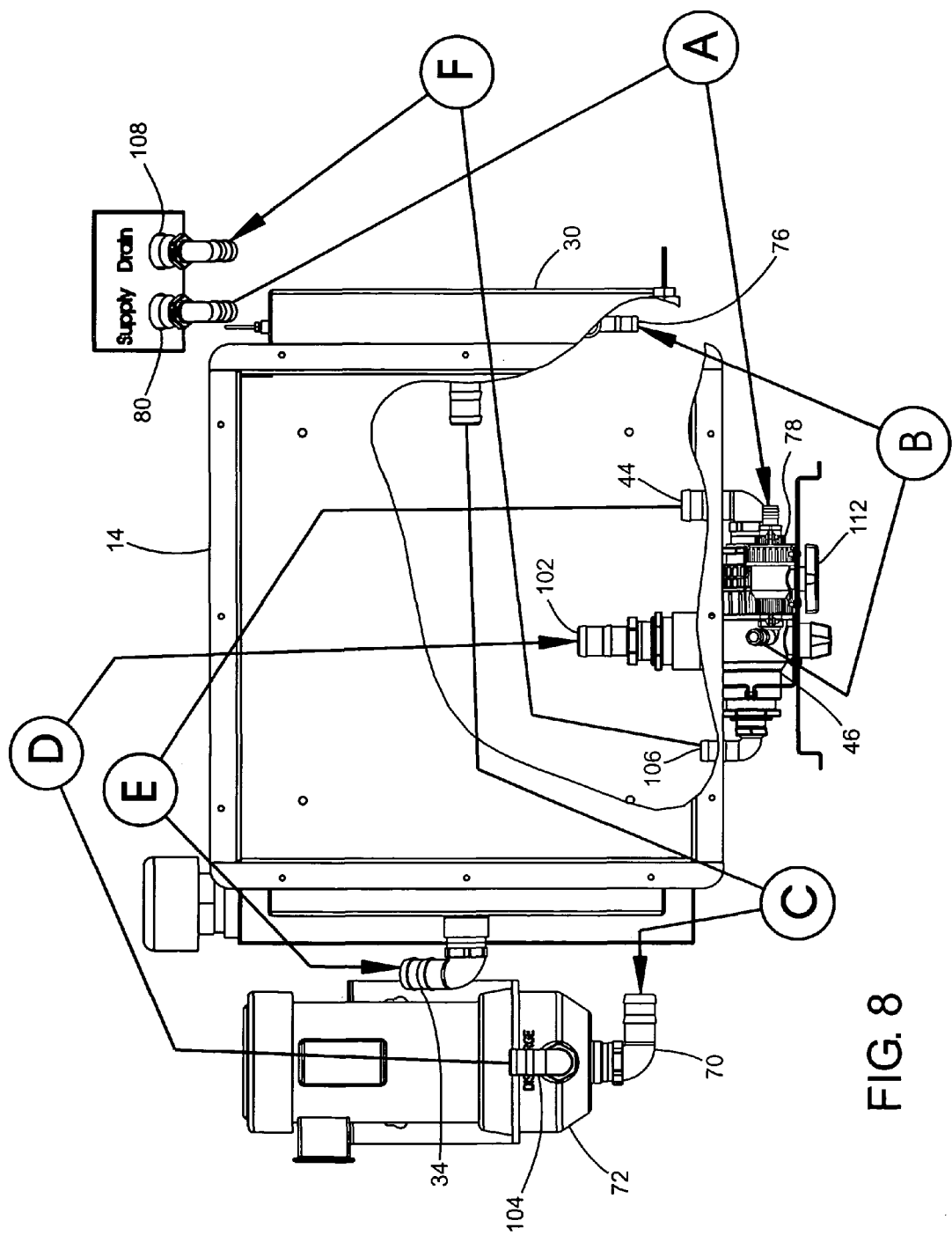
FIG. 8 is a top view of the preferred embodiment of the present invention illustrating liquid flows through a retention tank operatively associated with a pump and a three-way ball valve.
Figure 9:
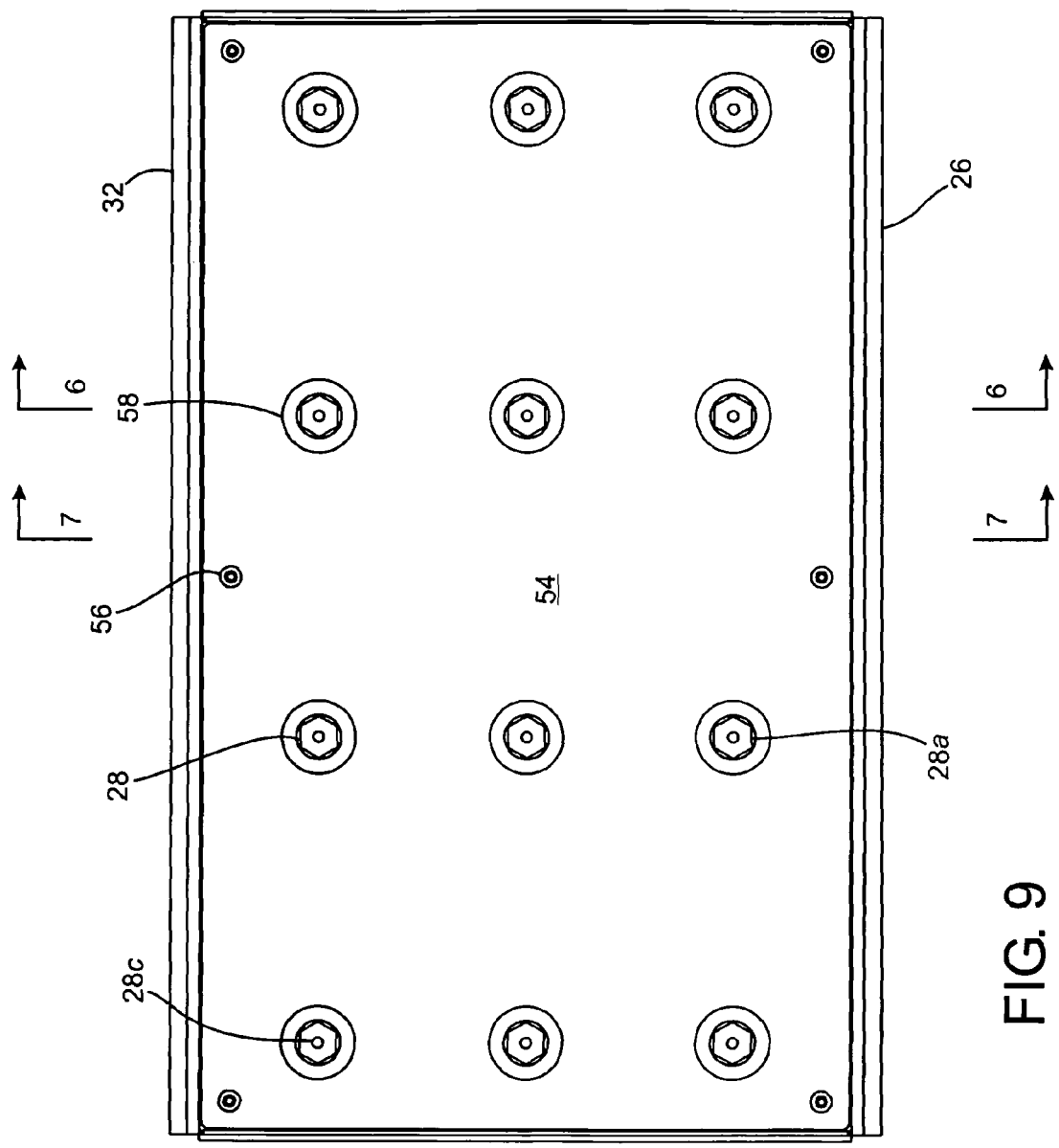
FIG. 9 is a front elevational view of the preferred embodiment of the present invention illustrating a box manifold.

As respectively denoted by paths D and F in FIG. 8, the three-way ball valve 46 supplementally comprises an intake stem 102 hydraulically connected to a discharge side 104 of the pump and a drain stem 106 hydraulically connected to an external drain line 108, which functionally serve to circulate and remove the aqueous cleaning solution through and from the interior chamber 22, respectively. In furthering the control of temperature, flow, and time functions, the tank assembly 12 is operatively equipped with a three-position selector switch 110 having operable modes designated as off, clean parts, and drain tank, as best illustrated in FIG. 10. In the clean parts mode, the operator or user of the support removal apparatus 10 can locally operate the incoming water supply by manually turning a handle 112 made part of the ball valve 78 in the direction of flow, after which the retention tank fills with the aqueous cleaning solution to a predetermined level. Time inputs are subsequently entered into the microprocessor 90 via the interface controller, whereas the controller start button is activated to power the heating element 84 and pump 72 for a set duration of time. The drain mode primarily serves as means for bypassing the microprocessor 90 insofar to simultaneously activate the pump 72 and a magnetic switch 114 integrally included as part of the three-way ball valve 78 to direct flow outwardly from the retention tank 14 via path F in FIG. 8.

Figure 11:
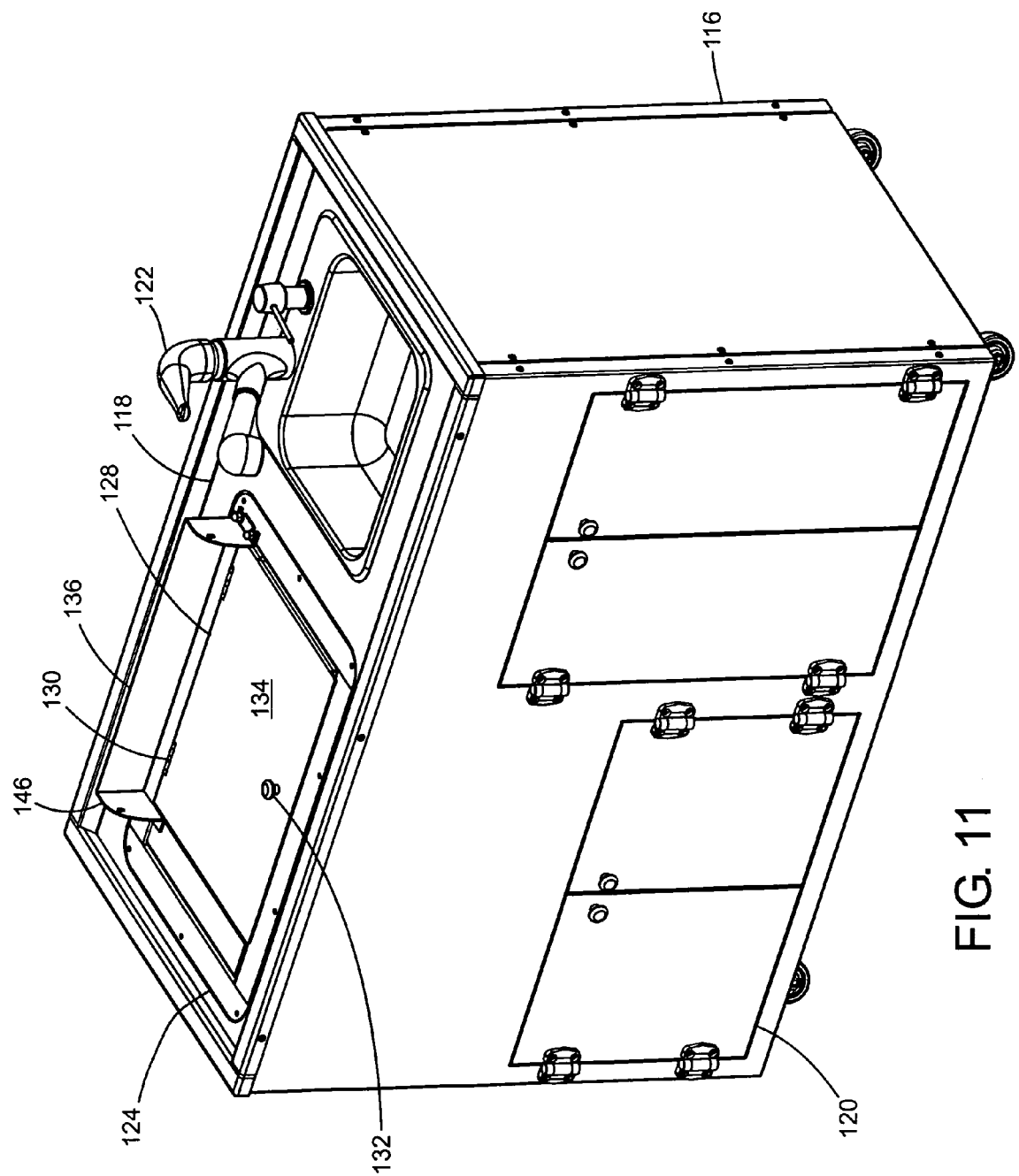
FIG. 11 is a perspective view of the preferred embodiment of the present invention illustrating a cabinet for housing a retention tank.
Figure 12:
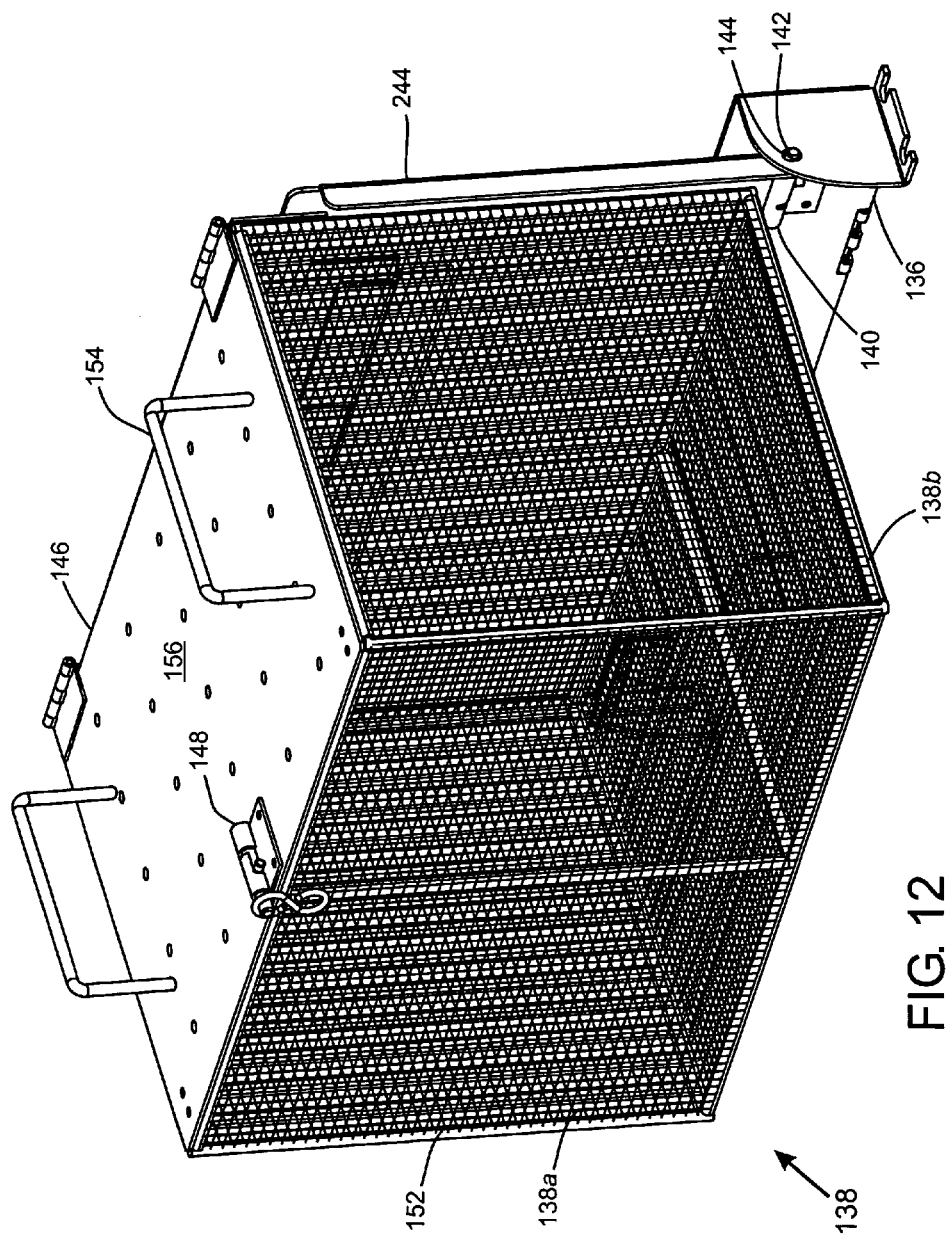
FIG. 12 is a perspective view of the preferred embodiment of the present invention illustrating a drop basket.
Figure 13:
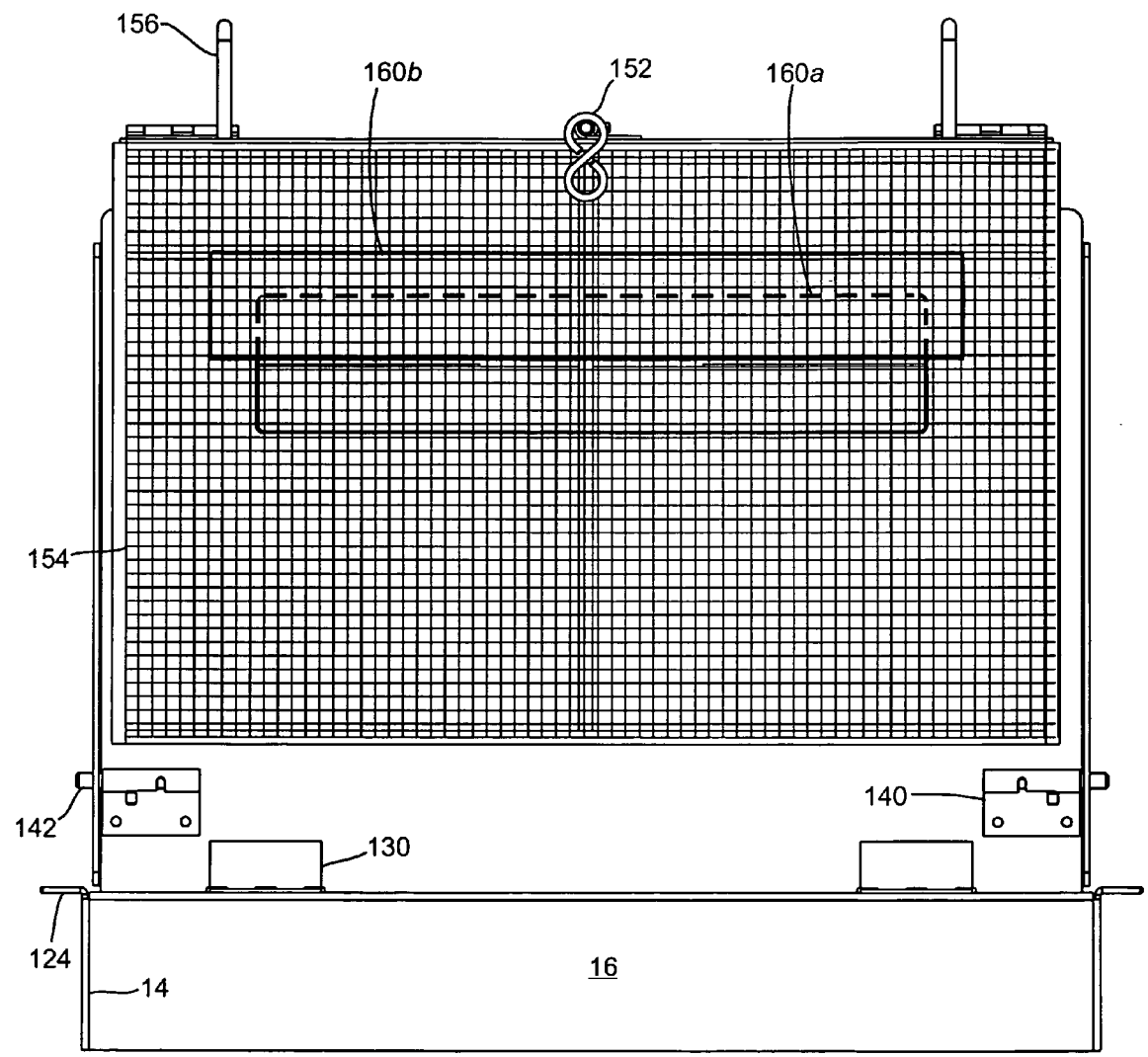
FIG. 13 is a front elevational view of the preferred embodiment of the present invention illustrating a drop basket.

In furthering the aesthetic appeal of the support removal apparatus 10, the tank assembly 12 as well as other operable components thereof may be collectively housed within a cabinet 116 having an integral work platform 118 equipped with recessed features and means to mitigate evaporative loss of the aqueous cleaning solution during operation. Supplementally, as shown in FIG. 11, the cabinet 116 may comprise accessible storage compartments 120 and a localized water source 122 and drain hydraulically connected to an external water supply and drain line (not shown), respectively. In this configuration, the retention tank 14 comprises a mounting flange 124 extending outwardly from and along an upper perimeter 126 integrally made part thereof, which substantially serves as means for securing and attaching the retention tank to the integral work platform of the cabinet. In mitigating evaporative loss of the aqueous cleaning solution during operation, the cabinet 116 supplementally comprises a cover 128 having a hinge 130 mounted along its back leading edge and a handle 132 attached to an exterior surface 134 thereof. A backstop 136 fixedly mounted to the work platform 118 suitably serves in controlling the extent to which the cover moves beyond the location of the cover's hinge and provides means for maintaining the vertical orientation of a drop basket 138 supplementally integrated as part of the cover, particularly of the type shown in FIG. 13. A pair of sliding brackets 140 each having a movable slide bar 142 to engage an opening 144 extending through an end wall 146 of the back stop serves as means for locking the cover to the backstop 136 in a substantial vertical orientation. The drop basket 138, as shown in FIGS. 12 and 13, comprises an overall rectangular configuration having perforated walls 138a and bottom 138b and a top lid 148 hingedly attached to one corner thereof and secured in place by a frontal latch 150 engaging a s-shaped member 152 mounted to a front side 154 of the drop basket. A pair of handles 156 mounted to an exterior surface 158 of the top lid 148 serves as means for lifting and lowering the top lid from and to the drop basket 138. Mounting of the drop basket to the cover 128 is primarily accomplished by upwardly and downwardly orientated lip brackets 160*a*, 160*b* configured in such a manner to slidably engage and lock with one another. As shown specifically in FIG. 13, the upwardly orientated lip bracket 160*a* is attached to a backside of the cover 128 and engages the downwardly orientated lip bracket 160*b* as attached to a backside of the drop basket.

It can be seen from the foregoing that there is provided in accordance with this invention a simple and easily operated device, which is particularly suited to operate side-by-side with a rapid prototype parts making machine in an office setting or similarly suited environment. The support removal apparatus 10 is completely functional in terms of removing water-soluble support material most efficiently from one or more rapid prototype parts given optimum operability in terms of aqueous cleaning solution type and concentration, agitation, and temperature.

It is obvious that the components comprising the support removal apparatus may be fabricated from a variety of materials, providing such selection or use of materials possess the capacity to withstand premature corrosion given the presence and use of an alkaline aqueous cleaning solution, notably falling within an applicable pH range of 8-11. Accordingly, it is most desirable, and therefore preferred, to construct the retention tank 14, integral work platform 118, and nozzle heads 28 and associated tips 28*a* from 316 stainless steel; pipe and fittings from a polymeric material such as polyamide (PA) or acrylonitrile-butadiene-styrene (ABS); and cabinet 116 from a lower grade stainless steel. It is noted herein that the retention tank, nozzle heads and tips, and integral work platform may be alternatively fabricated from materials to lessen the overall weight of the support removal apparatus yet maintaining sufficient resistance to corrosion, such as polypropylene, polyoxymethylene, polyphenylene, ABS, or PA. Similarly, the pump 72, thermocouple 86, heating element 84, and level indictor 96, particularly exposed operable components of each, are fabricated from a high grade stainless steel (316) or coated with an impervious, corrosive-resistant material such as epoxy.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention.

What is claimed is:

1. An apparatus for removing water-soluble support material from one or more rapid prototype parts, said apparatus comprising in combination:
    a retention tank having first, second, third, and fourth sidewalls and a base collectively joined together to form an interior chamber for containing and storing an aqueous cleaning solution with said first sidewall having an inlet opening extending therethrough;
    a box manifold having an outer casing externally attached to said first sidewall substantially over said inlet opening and a backing plate selectively configured with said outer casing to form an internal pressure box, said outer casing having an inlet adapter for passing therethrough the aqueous cleaning solution into said internal pressure box, said backing plate being relatively orientated parallel to said first sidewall and having a plurality of nozzle heads mounted thereto with each and every said nozzle head being held in a fixed perpendicular relation relatively to said backing plate to forcefully expel a jet stream of aqueous cleaning solution inward within said interior chamber and substantially toward said second sidewall oppositely positioned and relatively orientated parallel to said first sidewall to predominately establish a pattern of cross agitational flow of aqueous cleaning solution within said interior chamber relatively parallel to said third and fourth sidewalls;
    a drain box having an outlet opening and a drain intake in hydraulic communication with said interior chamber to supplementally develop and sufficiently maintain cross agitational flow of aqueous cleaning solution within said interior chamber in a non-whirlpool manner;
    means for heating the aqueous cleaning solution contained within said interior chamber to a predetermined temperature range;
    means for conveying the aqueous cleaning solution in and through said drain box and said box manifold;
    means for measuring the temperature of the aqueous cleaning solution contained within said interior chamber; and
    means for monitoring the aqueous cleaning solution level present within said interior chamber to correspondingly permit activation of said heating means and said conveying means for a predetermined time interval.

2. An apparatus as set forth in claim 1, wherein said heating means comprises a heat chamber having an elongate opening in hydraulic communication with said interior chamber and a heating element housed within said heat chamber to engage the aqueous cleaning solution.

3. An apparatus as set forth in claim 2, wherein said drain intake of drain box and said elongate opening of heat chamber each comprise a screen mounted thereto for inhibiting passage of rapid prototype parts and residual water-soluble support material support material into and through conveying means.

4. An apparatus as set forth in claim 1, wherein said heating means comprises a heating element externally attached to said retention tank to conductively heat the aqueous cleaning solution contained within said interior chamber.

5. An apparatus as set forth in claim 1, wherein said predetermined temperature range is approximately 40° F. to a set point of 150° F.

6. An apparatus as set forth in claim 1, further comprising a microprocessor having an input side for receiving inputs from said temperature measuring means and an output side for operably controlling said heating means and said conveying means.

7. An apparatus as set forth in claim 6, further comprising a three-position selector switch communicatively coupled to said microprocessor and having operable modes designated as off, clean parts, and drain tank.

8. An apparatus as set forth in claim 6, wherein said level monitoring means comprises a level indicator positioned internally within said interior chamber at a predetermined distance above said base and being communicatively coupled to said microprocessor.

9. An apparatus as set forth in claim 6, wherein said temperature measuring means comprises a thermocouple having an internal probe positioned within said internal chamber to engage the aqueous cleaning solution and an external lead communicatively coupled to said microprocessor.

10. An apparatus as set forth in claim 6, wherein said temperature measuring means comprises a thermocouple having an internal probe positioned internally in said drain box to engage the aqueous cleaning solution and an external lead communicatively coupled to said microprocessor.

11. An apparatus as set forth in claim 1, wherein said drain box is externally mounted to said second sidewall oppositely positioned to said box manifold.

12. An apparatus as set forth in claim 11, wherein said conveying means comprises a pump having an intake side hydraulically coupled to said outlet opening of drain box and a discharge side hydraulically coupled to said inlet adapter.

13. An apparatus as set forth in claim 11, wherein said conveying means comprises a three-way ball valve having intake and outlet stems and a pump having an intake side hydraulically coupled to said outlet opening of drain box and a discharge side hydraulically coupled to said intake stem of three-way ball valve, said inlet adapter of outer casing being hydraulically coupled to said outlet stem.

14. An apparatus as set forth in claim 13, wherein said three-way ball valve comprises a drain stem hydraulically coupled to an external drain line for removing spent aqueous cleaning solution from said retention tank.

15. An apparatus as set forth in claim 1, wherein said outer casing comprises an interior reinforcing plate integrally made part thereof, said box manifold further comprising a gasket situated in between said interior reinforcing plate and said backing plate to mitigate leakage thereabout to the extent of sufficiently maintaining a predetermined amount of pressure within said internal pressure box to forcibly expel the aqueous cleaning solution through each of said nozzle heads.

16. An apparatus as set forth in claim 1, wherein said backing plate comprises a plurality of apertures extending therethrough for receiving therein an equal number of collars each thereof having internal threads for threadably receiving a threaded body portion of said nozzle head.

17. An apparatus as set forth in claim 1, wherein each of said nozzle heads is fitted with a nozzle tip having an orifice ranging in diameter from 0.05 to 0.375".

18. An apparatus as set forth in claim 17, wherein said box manifold further comprises a nozzle plate mounted to said backing plate for forming thereinbetween a cavity for housing therein each of said nozzle tips and having a plurality of small apertures each extending therethrough and being substantially positioned to align with said nozzle tip to permit unhindered passage of the aqueous cleaning solution into said interior chamber.

19. An apparatus as set forth in claim 1, further comprising a cabinet having accessible storage capacity, an integral work platform, and a localized water source and drain each hydraulically coupled to an external water supply and drain line, respectively.

20. An apparatus as set forth in claim 19, wherein said retention tank comprises a mounting flange for attachment to said integral work platform, said cabinet further comprising a cover for covering said interior chamber to mitigate evaporative losses therefrom and having a hinge mounted along a back leading edge thereof, a handle mounted to an exterior surface thereof for handling said cover during operation, and a backstop for limiting and holding said cover at a predetermined angular position above said interior chamber.

21. An apparatus as set forth in claim 20, further comprising a drop basket geometrically configured to fit within the confines of said interior chamber and controllably retain rapid prototype parts therewithin while being place in an immersible environment of aqueous cleaning solution and susceptible to direct cross agitational flow originating from the directional orientation of said nozzle heads, said drop basket having perforated walls and bottom and a downwardly orientated lip bracket attached to a backside thereof to slidably accept and engage with an upwardly orientated lip bracket integrally included as part of said cover, said drop basket comprising a top lid hingedly attached to a corner thereof and secured thereat by a frontal latch engaging a s-shaped member mounted to a front side of said drop basket and having a pair of handles mounted on an exterior surface thereof, said cover further comprising a pair of sliding brackets each having a movable slide bar to engage an opening extending through an end wall of said backstop to lock said cover to said backstop in a substantial vertical orientation insofar to inattentively support said drop basket for furthering temporal release of aqueous cleaning solution from said drop basket downwardly into said interior chamber and making periodic inspection of rapid prototype parts held therewithin for processing.

22. An apparatus as set forth in claim 1, wherein the aqueous cleaning solution comprises a granular sodium composition of 25-70 weight percent sodium hydroxide and 5-30 weight percent sodium carbonate.

23. An apparatus as set forth in claim 1, wherein the aqueous cleaning solution comprises a concentration ratio of 1.05 pounds of granular sodium composition per one gallon of water.

24. An apparatus as set forth in claim 1, wherein the aqueous cleaning solution comprises a granular potassium composition of 25-70 weight percent potassium hydroxide and 5-30 weight percent potassium carbonate.

25. An apparatus as set forth in claim 1, wherein the aqueous cleaning solution comprises a concentration ratio of 1.05 pounds of granular potassium composition per one gallon of water.

26. An apparatus as set forth in claim 1, wherein said drain box comprises a water input opening hydraulically connected to an external water source for supplying fresh water into said interior chamber as selectively controlled by a water feed ball valve.

27. An apparatus for removing water-soluble support material from one or more rapid prototype parts, said apparatus comprising in combination:
  a retention tank having first, second, third, and fourth sidewalls and a base collectively joined together to form an interior chamber for containing and storing an aqueous cleaning solution with said first sidewall having an inlet opening extending therethrough;
  a box manifold having an outer casing externally attached to said first sidewall substantially over said inlet opening and a backing plate selectively configured with said outer casing to form an internal pressure box, said outer casing having an inlet adapter for passing therethrough the aqueous cleaning solution into said internal pressure box, said backing plate being relatively orientated parallel to said first sidewall and having a plurality of nozzle heads mounted thereto to forcefully expel a jet stream of aqueous cleaning solution inward within said interior chamber and substantially toward said second sidewall oppositely positioned and relatively orientated parallel to said first sidewall to predominately establish a pattern of cross agitational flow of aqueous cleaning solution within said interior chamber relatively parallel to said third and fourth sidewalls;
  a drain box having a drain intake in hydraulic communication with said interior chamber and an outlet opening, said drain box being externally mounted to and about the width of said second sidewall oppositely positioned to said box manifold to supplementally develop and sufficiently maintain cross agitational flow within said interior chamber in a non-whirlpool manner;
  a heat chamber having an elongate opening in hydraulic communication with said interior chamber;
  means for conveying the aqueous cleaning solution in and through said drain box and said box manifold;

a heating element having an external end communicatively coupled to a microprocessor and an internal end housed within said a heat chamber;

a thermocouple having an internal probe positioned within said interior chamber to engage the aqueous cleaning solution and an external lead communicatively coupled to said microprocessor for measuring temperature of the aqueous cleaning solution; and a level indicator positioned internally within said interior chamber at a predetermined distance above said base for measuring the level of the aqueous cleaning solution present in said interior chamber, said level indicator being communicatively coupled to said microprocessor via a timer to correspondingly permit activation of said heating element and said conveying means for a predetermined time interval.

28. An apparatus as set forth in claim 27, wherein said outer casing comprises an interior reinforcing plate integrally made part thereof, said box manifold further comprising a gasket situated in between said interior reinforcing plate and said backing plate to mitigate leakage thereabout to the extent of sufficiently maintaining a predetermined amount of pressure within said internal pressure box to forcibly expel the aqueous cleaning solution through each of said nozzle heads.

29. An apparatus as set forth in claim 27, wherein said box manifold further comprises a nozzle plate mounted to said backing plate for forming thereinbetween a cavity for housing therein each of said nozzle tips and having a plurality of small apertures each extending therethrough and being substantially positioned to align with said nozzle tip to permit unhindered passage of the aqueous cleaning solution into said interior chamber.

30. An apparatus as set forth in claim 27, wherein said conveying means comprises a three-way ball valve having intake and outlet stems and a pump having an intake side hydraulically coupled to said outlet opening of drain box and a discharge side hydraulically coupled to said intake stem of three-way ball valve, said inlet adapter of outer casing being hydraulically coupled to said outlet stem.

31. An apparatus as set forth in claim 27, further comprising a cabinet having accessible storage capacity, an integral work platform, and a localized water source and drain each hydraulically coupled to an external water supply and drain line, respectively, said retention tank comprising a mounting flange for attachment to said integral work platform, said cabinet comprising a cover for covering said interior chamber to mitigate evaporative losses therefrom and having a hinge mounted along a back leading edge thereof, a handle mounted to an exterior surface thereof for handling said cover during operation, and a backstop for limiting and holding said cover at a predetermined angular position above said interior chamber.

32. An apparatus as set forth in claim 31, further comprising a drop basket geometrically configured to fit within the confines of said interior chamber and controllably retain rapid prototype parts therewithin while being place in an immersible environment of aqueous cleaning solution and susceptible to direct cross agitational flow originating from the directional orientation of said nozzle heads, said drop basket having perforated walls and bottom and a downwardly orientated lip bracket attached to a backside thereof to slidably accept and engage with an upwardly orientated lip bracket integrally included as part of said cover, said drop basket further comprising a top lid hingedly attached to a corner thereof and secured thereat by a frontal latch engaging a s-shaped member mounted to a front side of said drop basket and having a pair of handles mounted on an exterior surface thereof, said cover further comprising a pair of sliding brackets each having a movable slide bar to engage an opening extending through an end wall of said backstop to lock said cover to said backstop in a substantial vertical orientation insofar to inattentively support said drop basket for furthering temporal release of aqueous cleaning solution from said drop basket downwardly into said interior chamber and making periodic inspection of rapid prototype parts held therewithin for processing.

33. An apparatus for removing water-soluble support material from one or more rapid prototype parts, said apparatus comprising in combination:

a retention tank having first, second, third, and fourth sidewalls and a base collectively joined together to form an interior chamber for containing and storing an aqueous cleaning solution with said first sidewall having an inlet opening extending therethrough;

a box manifold having an outer casing externally attached to said first sidewall substantially over said inlet opening and a backing plate selectively configured with said outer casing to form an internal pressure box, said outer casing having an inlet adapter for passing therethrough the aqueous cleaning solution into said internal pressure box, said backing plate being relatively orientated parallel to said first sidewall and having a plurality of nozzle heads mounted thereto to forcefully expel a jet stream of aqueous cleaning solution inward within said interior chamber and substantially toward said second sidewall oppositely positioned and relatively orientated parallel to said first sidewall to predominately establish a pattern of cross agitational flow of aqueous cleaning solution within said interior chamber relatively parallel to said third and fourth sidewalls;

a drain box having a drain intake in hydraulic communication with said interior chamber and an outlet opening, said drain box being externally mounted to and about the width of said second sidewall oppositely positioned to said box manifold to supplementally develop and sufficiently maintain cross agitational flow within said interior chamber in a non-whirlpool manner;

a heat chamber having an elongate opening in hydraulic communication with said interior chamber;

means for conveying the aqueous cleaning solution in and through said drain box and said box manifold;

a heating element having an external end communicatively coupled to a microprocessor and an internal end housed within said a heat chamber;

a thermocouple having an internal probe positioned within said interior chamber to engage the aqueous cleaning solution and an external lead communicatively coupled to said microprocessor for measuring temperature of the aqueous cleaning solution;

a level indicator positioned internally within said interior chamber at a predetermined distance above said base for measuring the level of the aqueous cleaning solution present in said interior chamber, said level indicator being communicatively coupled to said microprocessor via a timer to correspondingly permit activation of said heating element and said conveying means for a predetermined time interval;

a cabinet having an integral work platform, a cover attached to said integral work platform for covering said interior chamber to mitigate evaporative losses therefrom, and a backstop for limiting and holding said cover at a predetermined angular position above said interior chamber; and a drop basket geometrically configured to fit within the confines of said interior chamber and controllably retain rapid prototype parts therewithin while being place in an immersible environment of aqueous cleaning solution and susceptible to direct cross agitational flow originating from the directional orientation of said nozzle heads, said drop basket having perforated walls and bottom and a downwardly orientated lip bracket attached to a backside thereof to slidably accept and engage with an upwardly orientated lip bracket integrally included as part of said cover, said cover further comprising a pair of sliding brackets each having a movable slide bar to engage an opening extending through an end wall of said backstop to lock said cover to said backstop in a substantial vertical orientation insofar to inattentively support said drop basket for furthering temporal release of aqueous cleaning solution from said drop basket downwardly into said interior chamber and making periodic inspection of rapid prototype parts held therewithin for processing.

34. An apparatus as set forth in claim 33, wherein said conveying means comprises a three-way ball valve having intake and outlet stems and a pump having an intake side hydraulically coupled to said outlet opening of drain box and a discharge side hydraulically coupled to said intake stem of three-way ball valve, said inlet adapter of outer casing being hydraulically coupled to said outlet stem, said three-way ball valve comprising a drain stem hydraulically coupled to an external drain line for removing spent aqueous cleaning solution from said retention tank.

* * * * *